United States Patent [19]

Parker

[11] Patent Number: 4,490,117
[45] Date of Patent: Dec. 25, 1984

[54] INFLIGHT IFR PROCEDURES SIMULATOR

[75] Inventor: Loyd C. Parker, Cocoa Beach, Fla.

[73] Assignee: The United States of America as represented by the Administrator of the National Aeronautics and Space Administration, Washington, D.C.

[21] Appl. No.: 387,649

[22] Filed: Jun. 11, 1982

[51] Int. Cl.$^3$ .............................................. G09B 9/08
[52] U.S. Cl. ...................................... 434/35; 434/49; 434/242; 434/243
[58] Field of Search ....................... 434/29, 30, 49–53, 434/239–244, 35, 36

[56] References Cited

U.S. PATENT DOCUMENTS

| | | | |
|---|---|---|---|
| 3,546,350 | 12/1970 | Reynolds | 434/243 |
| 3,694,930 | 10/1972 | Howland et al. | 434/242 |
| 3,815,262 | 6/1974 | Patterson et al. | 434/35 |
| 3,886,334 | 5/1975 | Cummings et al. | 434/30 |
| 3,888,019 | 6/1975 | Trabanino | 434/35 |
| 4,233,756 | 11/1980 | Horwitz | 434/30 |
| 4,276,702 | 7/1981 | Horwitz | 434/49 |

OTHER PUBLICATIONS

David A. Brown, "In-Flight Simulator Capabilities Tested", Aviation Week & Space Technology, Aug. 9, 1971, pp. 35-37.

Primary Examiner—Richard C. Pinkham
Assistant Examiner—Leo P. Picard
Attorney, Agent, or Firm—James O. Harrell; John R. Manning

[57] ABSTRACT

An inflight IFR procedures simulator for generating signals and commands to conventional instruments provided in an airplane. The simulator includes a signal synthesizer which generates predetermined simulated signals corresponding to signals normally received from remote sources upon being activated. A computer is connected to the signal synthesizer and causes the signal synthesizer to produce simulated signals responsive to programs fed into the computer. A switching network is connected to the signal synthesizer, the antenna of the aircraft, and navigational instruments and communication devices for selectively connecting instruments and devices to the synthesizer and disconnecting the antenna from the navigational instruments and communication device. Pressure transducers are connected to the altimeter and speed indicator for supplying electrical signals to the computer indicating the altitude and speed of the aircraft. A compass is connected for supply electrical signals for the computer indicating the heading of the airplane. The computer upon receiving signals from the pressure transducer and compass, computes the signals that are fed to the signal synthesizer which, in turn, generates simulated navigational signals.

8 Claims, 4 Drawing Figures

INFLIGHT IFR PROCEDURES SIMULATOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Generally, pilots have received training leading to their instrument flight certification by using ground base table top simulators to learn basic attitude and instrument navigation procedures, followed by flight with an instructor pilot for exposure to actual cross country and terminal area conditions. Both of these methods of training have proved less than totally satisfactory.

Heretofore when a student received Instrument Flight Rules (IFR) training in an aircraft, it was necessary to actually fly the aircraft with an instructor to airports and other areas which have equipment which generates the necessary electronic signls, electronic replies to aircraft systems and has air traffic control facilities so that the student can receive, observe and operate the aircraft instruments in the plane and practice instrument navigation; landing; departure, and enroute procedures and operations of an aircraft solely by reference to the aircraft flight instruments required for instrument flight. This normally required such training to take place in congested flight areas which are equipped with the necessary electronic systems, such as found at airports and along the air route system. As can be seen, it is extremely dangerous and disruptive to orderly air traffic flow in that you have an inexperienced person being trained for flight IFR licensing while other commercial and private flights are taking place in the same airspace. In fact, all recent mid-air collisions involving air carrier aircraft included general aviation pilots that were in training near congested airports. The National Transportation Safety Board, as a result of the San Diego mid-air collision recommended that airports and other navigation facilities be constructed in remote non-congested areas to permit IFR training away from commercial air operations. This invention permits such training in remote, non-congested areas without the need for the expensive construction of ground based systems normally referred to as Reliever Airports in the NTSB recommendations. Further, current IFR training is practically impossible in the heavy traffic areas, however, these are the airports & areas which are equipped with the electronic systems necessary for the student to develop the multiplicity of skills necessary to achieve his instrument rating. Since most of this training is normally conducted during visual flight rule (VFR) conditions, the student rarely receives training that is equivalent to that required under actual IFR conditions. Hence, this training in many respects is inadequate. Finally, most pilot training is based at airports remote from the highly congested airports, however, these airports are not equipped with all, and in many cases, any of the electronic systems used for controlling and guiding the student during IFR training flights. Therefore, in addition to being unable to conduct the training at such airports, another problem is that it requires additional time and student expense for the aircraft and instructor to fly to and from the remote airports to properly equipped airports to achieve the training and consumes significantly more fuel.

The table top ground based IFR simulators are an alternative that are both econmical and safe and have the additional advantage of permitting the instructor to autonomously control the selection, sequence and repetition of the training exposure unconstrained by either weather or traffic.

Another advantage of ground simulators is the capability to interrupt or "freeze" the training so as to allow the instructor to provide critical feedback information to the student in a timely, safe and relaxed manner.

Despite these and other advantages, a number of limitations have been reported in the use of ground training devices. One of the more serious general aviation pilot training is attitudinal and concerns the inability or unwillingness of students to take seriously the capabilities of the device to condition critical skills which will transfer to the aircraft. This tendency to treat the device as a toy can seriously degrade training because poor piloting techniques and procedures acquired in the use of the device will almost certainly transfer to the aircraft.

There also has been much more resistance within general aviation to the replacement of flying time with ground trainer time. Many students trained by fixed base operators feel that their training dollars should be applied to training in the "real thing" even if it means that such training is ultimately more expensive.

Finally, the ground training devices have acquired some disrepute on the basis of their lack of physical fidelity to the aircraft. The feeling persists among many training personnel that use of a device that does not produce physical indications exactly like those experienced in the aircraft will result in inferior training.

SUMMARY OF THE INVENTION

The inflight trainer constructed in accordance with the present invention enables students to be trained in a conventional airplane at remote areas or in areas where there is little air traffic while receiving simulated signals produced by equipment carried on the plane that would correspond to the normal signals that a pilot would anticipate receiving during IFR flights and landing and departure procedure.

In order to demonstrate this art, studies were conducted at Embry-Riddle University in Daytona Beach Florida, using apparatus which demonstrated the concept of this invention. These studies concluded that the concept was not only a feasible and desirable training device, but that students trained using only the Inflight IRF Simulator were more proficient in skills development than those trained using table-top simulators and in aircraft in the conventional manner.

The inflight trainer constructed in accordance with the present invention generates simulated signals and commands to conventional instruments provided in the airplane. All of the navigational instruments that are conventionally provided in the airplane for IFR flights such as glide slope, localizer and VHF omni-directional radio range (VOR) navigational receivers (NAV), distance measuring equipment (DME), automatic directional finder (ADF), marker beacon receiver, along with standard aircraft instruments such as the altimeter, air speed indicator, and heading indicator are utilized.

A signal synthesizer means is included within the trainer and is placed on the airplane for generating predetermined simulated signals corresponding to the signals normally received from remote surfaces. A computer is connected to the signal synthesizer means causing the signal synthesizer means to produce simulated signals responsive to predetermined programs. The programs are fed into the computer by any suitable program means, such as cassette recorders. A switching network means is connected to the signal synthesizer, the conventional antennas of the aircraft, and the navigational instruments for selectively connecting the navigational instruments to the synthesizer means and disconnecting the antennas from the navigational instruments.

Pressure transducers are connected to the altimeter and the air speed static and total pressure line for supplying electrical signals to the computer indicating the altitude and the speed of the aircraft. Signal converter means is connected between the pressure transducer means and the computer for transmitting signals produced by the pressure transducer means to the computer. Such signals are fed to the computer for computations which enable producing simulated signals that are read on the instruments provided in the aircraft.

Signals from a directional gyroscope or remote compass means are transmitted through the signal converter means to the computer means. Signals from the directional gyro are utilized by the computer means in conjunction with airspeed signals to calculate the position and heading of the aircraft with respect to the simulated airports, airway system, and signals from remote surfaces that are necessary for causing the signal synthesizer to generate the signals which are suitable for properly influencing the aircraft's navigation instruments.

A synthetic voice unit means is provided which is envisioned as a voice microprocessor chip of current art under control of the computer. The synthetic voice unit may, however, be a computer controlled recorder or other means whereby voice messages controlled by the computer means are issued to the student pilot. The voice messages issued to the student from the synthetic voice unit are routed through the signal synthesizer means and modulated on the appropriate VHF radio channel(s) assigned to the student for completing the simulated IFR flight plan. These signals may be directly connected to the student's headset as an optional means. The synthetic voice means provides the voice means whereby voice instructions, clearances, and vectors are provided to the student as if he were operating in the real air traffic control environment. Student responses to the synthetic voice means are monitored by the instructor, however, it is within the art to detect and comprehend student voice responses via computer means and such art is included as an optional feature of this invention.

A control unit means is provided to enable the instructor to load the proper simulation scenario into the computer means from the tape recorder means, to initiate the simulated IFR flight after arriving in the training area, to interrupt the simulation for the purpose of instruction and correction of student errors, for resetting the simulation to allow the student to repeat a simulated procedure, for setting in simulated wind magnitude and direction, and for control of the recording means.

A recorder means is provided for the purpose of loading the computer with the program for simulated IFR flight, for providing recorded air traffic control instructions if such means are used and for recording student pilot performance (or voice replies) in flying the simulated IFR flight.

Accordingly, it is an important object of the present invention to provide an inflight IFR procedure simulator which can be placed on a conventional airplane that will generate signals to correspond to normal signals that a student pilot would encounter while flying a predetermined flight plan and landing approach.

Another important object of the present invention is to provide an inflight rules trainer that can be readily plugged into conventional equipment of an airplane for training students in instrument flight rules.

BRIEF DESCRIPTION OF THE DRAWING

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
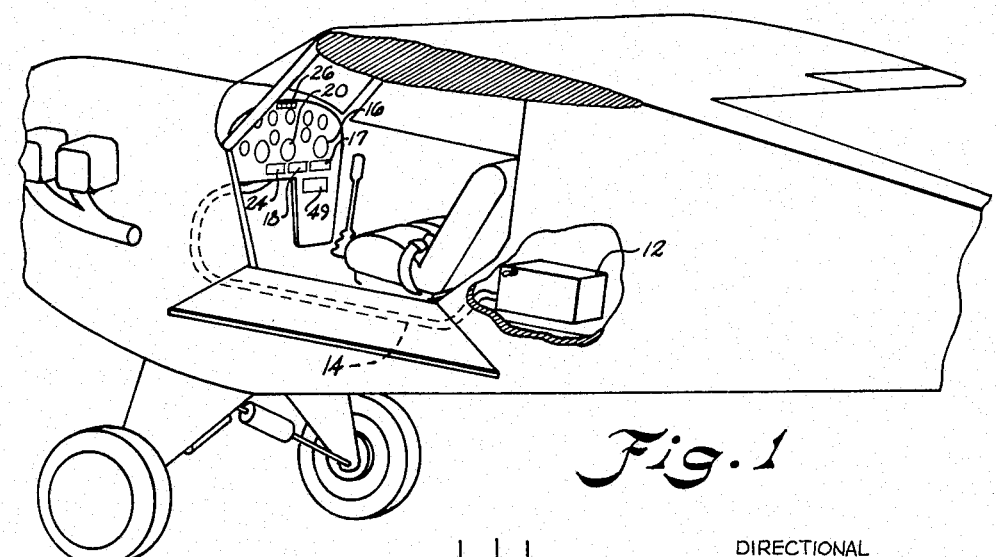
FIG. 1 is a perspective view with parts broken away illustrating the inflight rules trainer positioned in an airplane.
Figure 2:
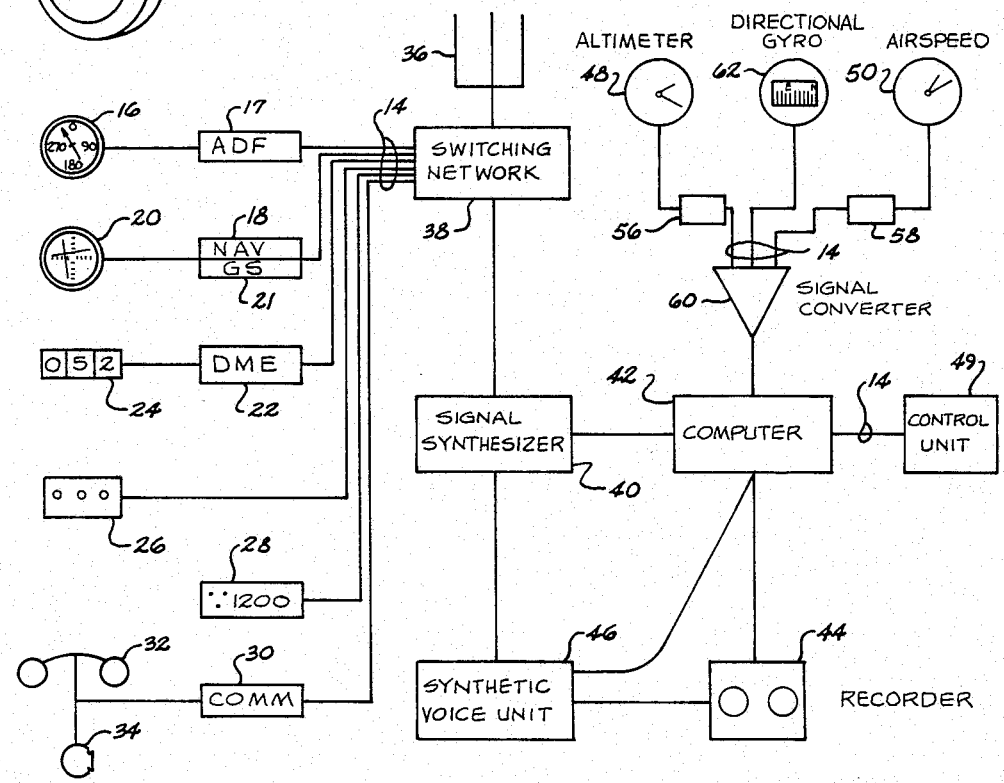
FIG. 2 is a block diagram showing the inflight rules trainer and the conventional navigational instruments of the airplane.

Referring to FIG. 1 of the drawing, there is illustrated a typical airplane 10 that is adapted to receive the Inflight IFR Procedures Simulator. The IFR simulator is generally placed in a box 12 that is plugged in by lines 14 connected to the conventional navigational and communications receivers 17, 18, 21, 22, 28, and 30 and to end instruments 16, 20, 24, 26, 32, and 34, which are located in the conventional cockpit locations for such means. Additionally, the box 12 is connected by lines 14 to control unit 49 and transducers 56 and 58 which are located in a convenient cockpit location suitable for means performed. Typical instruments utilized in conventional airplanes are an Automatic Direction Finder (ADF) 16 and 17 which when tuned to various omnidirectional transmitting stations, generally emitting signals between 190KHz and 1750KHz give the pilot on display 16 an indication of the bearing to that transmitter from the nose of the aircraft. To fly the aircraft to a transmitting site using the ADF, the pilot turns the nose of the aircraft to a heading such that the ADF indicator is 16 points to zero on the indicator.

A navigational receiver (NAV) 18 is used to select discrete frequencies between 108 mHz and 188 mHz transmitted by various VHF omni-directional radio range (VOR) stations which are conveniently located at airports and at other locations which link together forming traffic routes from station to station. NAV 18 is also used frequencies generated by Instrument Landing System (ILS) transmitters called localizers which are located on airport surfaces and aligned with the centerline of an instrument runway at such airports.

The indicator 20 receives these navigation signals and has a rotating bezel which allows the pilot to rotate for setting a bearing. It enables the pilot to determine his magnetic direction to or from a VOR transmitter selected by the navigational receiver. By flying to and from these VOR stations, a pilot can navigate the air traffic system from one station to another or along these flight paths which are called air routes.

Indicator 20, omni-bearing selector (OBS) is equipped with a vertical course deviation indicator (CDI) needle which indicates the deviation left or right of aircraft position from the selected course and further a flag on the OBS (20) indicates if the magnetic courses selected represents a radial to or from the selected VOR station. When an ILS localizer frequency is selected, the CDI always indicates deviation left or right of course when flying toward the ILS runway regardless of the OBS (20) course selected. When an ILS frequency is selected on NAV receiver 18, a corresponding frequency is selected on the glide slope receiver 21 at those airports equipped with a glide slope transmitter. Signals from the glide slope receiver 21 are displayed on a horizontal glide slope deviation needle of the OBS indicator 20, and indicate aircraft deviations above or below the glide slope transmitted from the airport surface of the ILS runway.

Distance measuring equipment (DME) 22 includes an airborne transmitter receiver unit which is capable of measuring the distance to a ground base unit collocated at a VOR sight designated as a VORTAC. The DME frequency is correlated with each VOR frequency and selection is normally made by the VOR navigation receiver for both units, i.e. VOR and DME. Hence, whenever a VORTAC is selected, both radial and distance to the VORTAC is obtained in the aircraft. The DME is used for determining fixes along air routes, navigational timing tasks by ground speed estimates and for certain instruments approaches to airports, such as VOR-DME and DME approaches. The instrument 24 produces a visual reading indicating the distance to the vortac in nautical miles. A marker beacon display and receiver 26 basically includes three lights which are located on the cockpit panel and a tone receiver which detects the presence of the aircraft crossing a fan or omni-directional marker beacon tone and a light is displayed when the aircraft crosses that beacon. These are normally located on the final approach to landing and are called the outer marker beacon and the middle marker beacon which allows the pilot on an ILS approach using the NAV to locate himself with regard to distance from the runway. It informs the pilot that the plane is a predetermined number of miles from the end of the runway when the light signal turns on. All of the above instruments previously discussed are conventional instruments on an aircraft.

A transponder 28 is a transceiver which responds to interrogations by an airtraffic control radar (ATC). By re-transmitting a coded pulse to that ATC radar receiver, the radar is able to determine the location from the transmitted pulse and from its code, determine the type of flight. The transponder is used in the ATC radar system as an identifier for use specifically and normally when the airplane is operated in the air traffic control system. The airplane is assigned a transponder code (4-digit code) that allows the plane to be identified as it flys through the various control systems.

A communication receiver 30, which includes headphones 32 and a mouthpiece 34, is provided for communicating orally with ground facilities such as air traffic controllers, towers, and weather stations. Various frequencies can be set on the communication receiver 30. In the subject invention, it is envisioned that only one-way communication would be involved, however two-way within the art, and that would be voice communication generated under control of a computer or microprocessor that is described more fully below. Presently, on the airplane, each of the transceivers 17, 18, 21, 22, 26, 28, and 30 has an antenna for transmitting receiving signals from appropriate conventional transmitter utilized during the navigation of the airplane. In order to disconnect these antennas 36 from the particular transceivers, a switching network 38 is provided so that simulated signals can be fed to the transceivers rather than the conventional signals received by the antenna 36. The switching network 38, which is described in more detail later, includes a switch for each transceiver 16, 18, 21, 22, 26, 28 and 30 which is essentially equivalent to a coaxial switch that disconnects the transceiver unit from its antenna 36 and reconnects it to a signal synthesizer 40. The signal synthesizer 40 produces identical simulated signals that would be received by the antenna and as far as the transceivers are concerned, there is no difference between the simulated signals and the normal signals received. The signal synthesizer 40 has a number of oscillators provided therein capable of being modulated by a computer 42 which, when the student selects a given training scenario, they produce a particular frequency representing the normal navigational signals received during a flight. For transponder 28, certain optional embodiments of this invention are available. During an IFR flight, the pilot is directed by air traffic control to select various four digit codes on transponder 28 to provide positive radar identification. In order for the student to set transponder codes as part of the simulated IFR procedures, the transponder must be disconnected from the antenna 36 and interrogation pulses would be fed thereto under computer control in order to prevent transmission of an unassigned code to a real ATC facility. This is the embodiment envisioned, however, this often eliminates the ATC radar tracking of such a training aircraft and the protection to other aircraft provided when such an aircraft is identified by the transponder code assigned of 1200 or 1400 depending on aircraft altitude. To eliminate this deficiency a separate transponder could be included in synthesizer 40 which is connected to antenna 36 such that radar replies code 1200 continue to be transmitted to the ATC radars. A second embodiment would be to capture the transponder 28 reply in the synthesizer 40 and to reformat the code to 1200 regardless of transmitted code and then allowing the reformatted code 1200 transmission to occur through antenna 36.

It is to be understood that the signal synthesizer is generating a plurality of signals which would be identical to the signals normally received by the antennas 36 associated with respect to transceivers 17, 18, 21, etc. and indicators, and as far as the airplane is concerned, during flight, it would not be able to tell any difference. The signal synthesizer is under control of the computer 42 which can be programmed according to a desired airport and air route system and equipped with standard navigational aids necessary to perform the simulated flight plan. The computer 42 can be programmed by any suitable means such as a cassette recorder 44 so that different airports, air route systems, NAV-aids and flight plans can be simulated. The computer and the recorder can be any suitable conventional digital microprocessor or analog computer and recorder combination available in the art. The computer 42 receives information from the various transducers and generates controls for voice messages through the synthetic voice unit 46 as well as transmitter frequencies necessary for the navigation.

In a conventional airplane, you normally have two indicators referred to as the altimeter 48 and air speed indicator 50. The altimeter indicates the pressure altitude of the aircraft above sea level and the air speed indicator indicates the relative air speed of the aircraft. They are mechanical instruments that produce indications by measuring the pitot tube 52 pressure and static pressure produced by a static port 54 of the airplane in flight. These tubings are mechanically coupled to the altimeter 48 and air speed indicator 50. In order to conduct the simulation, it is necessary to put pressure transducers 56 and 58 in the line so as to produce electrical signals responsive to the pressures in the tube that can be fed to the computer 42.

The reference signals produced by the transducers 56 and 58 are normally in the form of analog signals and are converted to digital or other suitable form of signals by a signal converter 60 and then fed to the computer 42 for computing navigational signals that relate the position and altitude of the airplane in the simulation. A directional gyro 62 having an electrical signal output was similarly connected to the signal converter 60 for providing signals to the computer 42 indicating the actual heading and position time history of the airplane. These computations are then fed from the computer 42, to the signal synthesizer 40 and to the transceivers being observed by the pilot.

Figure 3:
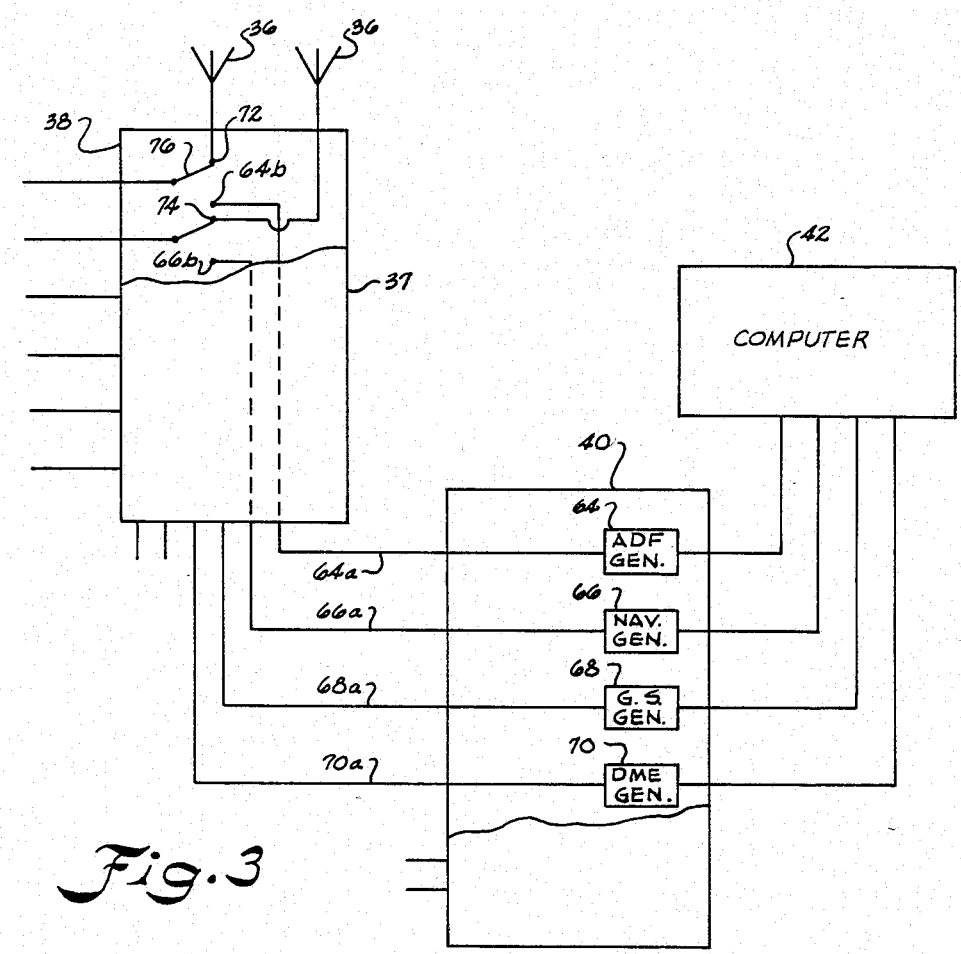
FIG. 3 is an enlarged block diagram of the signal synthesizer being connected between the microprocessor and switching network.
Figure 4:
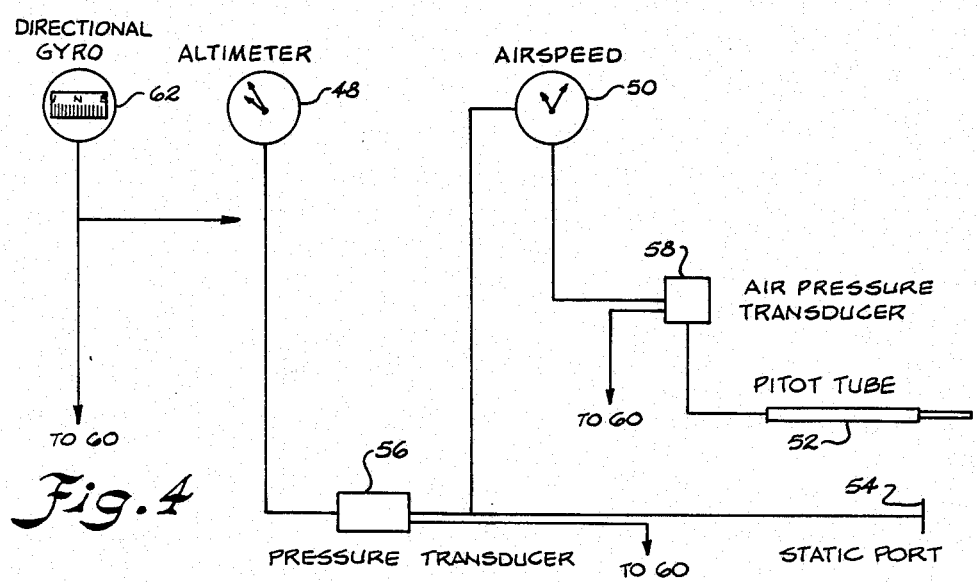
FIG. 4 is a diagrammatic diagram showing air pressure transducers inserted in the airplanes pitotstatic lines.

In FIG. 3, there is shown a more detailed block diagram of the switching network 38 and the signal synthesizers 40. As can be seen, the outputs of the oscillators 64 through 70 of the signal synthesizers are coupled through lead lines 64a, 66a, 68a and 70a to one contact 64b of a two pole switch. Only two of the switches are shown for purposes of clarity. The other poles of the switches 72 and 74 are connected to the conventional antennas 36 associated with the airplane. By moving the contact arm 76, the ADF generator forming part of the signal synthesizer 40 can be connected to the ADF transceiver 16 and the antenna 36 associated with that switch is disconnected. This permits the simulated signals to be connected to the transceivers located in the airplane. It is to be understood, of course, that these switches can be changed individually or all simultaneously depending on the particular switching network selected.

In operation, a typical flight simulation might involve a student and a instructor pilot in a plane properly equipped with the invention who would take off from a local airport and proceed to some remote area. Normally, prior to taking off, they would load the training simulator from a cassette tape into the computer 42. They would then take out the navigational and approach charts for that particular scenario and the flight plan that was filed for the particular simulation. They would proceed to the altitude specified for the airport which would probably be some 500 to 1,000 feet above the existing ground level and proceed on a training IFR simulated flight and the flight plan that was filed for the particular simulation. They would receive through the synthetic voice unit 46, a voice clearance to take off. They would next hear from the simulated voice unit 46 a clearance to take off and climb to and maintain their heading for that particular scenario. They would then proceed to fly a predetermined course that was called for in their flight plan using the simulated references for the various navigation devices that are shown on his chart as well as on the approach charts. All voice instructions would be controlled and discussed by the computer 42. As the airplane takes off, the computer 42 continually updates the aircraft's position and all the bearings and distances to the various navigational aids. These data are then converted by the computer and signal synthesizers 40 to represent the signals that the navigational equipment should receive for the aircraft's position. The pilot may check bearings or radials and distance to various VOR's, beacons, etc. by selection of the correct frequency indicated on the simulation map or approach plates. As the pilot flies his preplanned route, various ATC voice messages are issued by the synthetic voice unit 46, including frequency changes from tower to various ATC centers as appropriate for the phase of flight. Having the voice messages under computer control also enables the computer 42 to generate messages similar to ATC—when and if the pilot strays from the preplanned course much like ATC would do in a real flight. Radar vectors, speedchanges and altitude assignments are often utilized by ATC to give pilots procedures to be flown in terminal areas for the purpose of separating traffic, providing orderly flow and headings to be flow to intercept ILS signals for final approach. There are embodiments of this invention that would be incorporated and utilized as part of the IFR training simulation under the control of the computer 42 with voice instructions for such purposes issued by voice synthesizer 46 to the student pilot. Data on pilot performance can also be taken and stored for post-flight assessment if desired and equipment provided for this purpose. The simulation would end upon completion of the approach at the designation airport and could include missed approach procedures in case of a poor approach or if the pilot wishes to exercise those procedures. Several modes of operation of the simulation are also possible for the training purposes. For example, the simulation and position integration position could be stopped to allow an instructor to explain a student error or the voice simulation halted position and integration continue which allows practice of a given procedure such as a holding pattern.

While a preferred embodiment of the invention has been described using specific terms, such description is for illustrative purposes only, and it is to be understood that changes and variations may be made without departing from the spirit or scope of the following claims.

What is claimed is:

1. An inflight IFR procedures simulator for generating signals and commands to built in conventional instruments provided in an airplane during actual airplane flight; said airplane being equipped with a receiver antenna means which normally supplies navigational signals from ground stations to said built in conventional navigational instruments on board the airplane such as a navigational receiver (NAV), distance measuring equipment (DME), and automatic directional finder (ADF), and a marker beacon receiver, and a transponder, and communication receiver located in said airplane, said simulator comprising:

(a) a signal synthesizer means generating predetermined simulated signals corresponding to navigational signals normally received from remote sources upon being activated;

(b) a computer means connected to said signal synthesizer means causing said signal synthesizer means to produce simulated navigational signals responsive to programs during said actual flight;

(c) means for supplying said programs to said computer means;

(d) switching network means connected to said signal synthesizer, said antenna means and said navigational instruments and communication devices, means for selectively switching said switching network means between a first position and a second position, said switching network means when in said first position connecting said conventional built in navigational instruments to said synthesizer means and disconnecting said antenna means from said built in navigational instruments and communications means, said switching network means when in said second position connecting said antenna means to said built in navigational instruments and communications means and disconnecting said synthesizer means from said built in navigational instruments and said communications means;

(e) pressure transducer means connected to said altimeter and a speed indicator for supplying electrical signals to said computer means indicating the altitude and speed of said airplane during said flight;

(f) a compass means for supplying electrical signals to said computer means indicating the heading of said airplane during said flight; and (g) said computer means upon receiving signals from said pressure transducer means and compass means thereby computing signals that are fed to said signal synthesizer means which in turn generates simulated navigational signals during said actual flight training.

2. The inflight IFR procedures simulator as set forth in claim 1 further comprising:
a plurality of oscillators provided in said signal synthesizer generating predetermined signals simulating the normal signals that a student would observe on said navigational instruments while flying a predetermined flight plan and landing approach.

3. The inflight IFR procedures simulator as set forth in claim 1 further comprising:
an signal converter means connected between said pressure transducer means, said compass means, and said computer for converting analog signals produced by said pressure transducer and compass means to suitable signals.

4. The inflight IFR procedures simulator as set forth in claim 3 further comprising:
(a) at least one of said pressure transducer means being interposed in a tube extending between a static pressure port and said altimeter.

5. The inflight IFR procedures simulator as set forth in claim 1 further comprising:
(a) a directional heading means carried on said airplane generating an electrical signal indicating the direction that said airplane is heading and supplying said signal to said computer.

6. The inflight rules trainer as set forth in claim 1 further comprising:

(a) a recorder means connected to said computer means for loading said computer means with programs of different flight scenario.

7. An inflight IFR procedures simulator for generating signals and commands to conventional built in instruments provided in an airplane during actual flight; said airplane being equipped with a receiver antenna means which normally supplies navigational signals from ground stations to navigational instruments on board said airplane such as a navigational receiver (NAV), distance measuring equipment (DME), an automatic directional finder (ADF), and a market beacon receiver, and an altimeter, and air speed indicator located in said air plane, said trainer comprising:

(a) a signal synthesizer means generating predetermined simulated signals during said flight corresponding to navigational signals normally received from remote sources upon being activated;

(b) a microprocessor means connected to said signal synthesizer means causing said signal synthesizer means to produce simulated navigational signals responsive to programs during said flight;

(c) means for supplying said programs to said microprocessor;

(d) switching network means connected to said signal synthesizer, said antenna means and said navigational instruments for selectively connecting said navigational instruments, means for selectively switching said switching network means between a first position and a second position, said switching network means when in said first position connecting said conventional built in navigational instruments to said synthesizer means and disconnecting said antenna means from said built in navigational instruments and communications means, said switching network means when in said second position connecting said antenna means to said built in navigational instruments and communication means and disconnecting said synthesizer means from said built in navigational instruments and said communications means;

(e) a plurality of oscillators provided in said signal synthesizer means generating said predetermined simulated signals responsive to said switching network means disconnecting said antenna means from said navigational instruments and making connection between said switching network means and said synthesizer during said flight;

(f) pressure transducer means connected to said altimeter and air speed indicator for supplying electrical signals to said microprocessor means indicating the altitude and speed of said airplane during said flight, and (g) said microprocessor means upon receiving signals from said pressure transducer means computing signals that are fed to said signal synthesizer means which in turn generates simulated navigational signals during said flight.

8. The inflight IFR procedure simulator as set forth in claim 1 further comprising:

(a) a synthetic voice unit means which when directed by said computer means issues simulated voice messages through the said signal synthesizer and said switching network to said communication means;

(b) a control unit means which is electrically connected to said computer means which controls the operation of said computer and simulation means.

* * * * *